(12) United States Patent
Yoshikawa

(10) Patent No.: US 11,163,298 B2
(45) Date of Patent: Nov. 2, 2021

(54) MONITORING SYSTEM AND MONITORING METHOD

(71) Applicant: Mitsubishi Electric Corporation, Tokyo (JP)

(72) Inventor: Erina Yoshikawa, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 58 days.

(21) Appl. No.: 16/643,590

(22) PCT Filed: Oct. 5, 2017

(86) PCT No.: PCT/JP2017/036381
§ 371 (c)(1),
(2) Date: Mar. 2, 2020

(87) PCT Pub. No.: WO2019/069436
PCT Pub. Date: Apr. 11, 2019

(65) Prior Publication Data
US 2020/0241513 A1 Jul. 30, 2020

(51) Int. Cl.
G05B 19/05 (2006.01)
G05B 19/418 (2006.01)
G05B 23/02 (2006.01)

(52) U.S. Cl.
CPC ..... *G05B 19/41885* (2013.01); *G05B 19/058* (2013.01); *G05B 23/02* (2013.01)

(58) Field of Classification Search
CPC . G05B 19/41885; G05B 19/058; G05B 23/02
See application file for complete search history.

(56) References Cited

U.S. PATENT DOCUMENTS 7,194,396 B2 * 3/2007 Watanabe .............. B25J 9/1671
345/418
7,979,254 B2 * 7/2011 Ohashi ............... G05B 19/4069
703/7

(Continued)

FOREIGN PATENT DOCUMENTS

JP 07-064618 A 3/1995
JP 11-024735 A 1/1999

(Continued)

OTHER PUBLICATIONS

International Search Report and Written Opinion dated Nov. 7, 2017 for PCT/JP2017/036381 filed on Oct. 30, 2017, 8 pages including English Translation of the International Search Report.

(Continued)

*Primary Examiner* — Gary Collins
(74) *Attorney, Agent, or Firm* — Xsensus LLP

(57) ABSTRACT

A monitoring device obtains information of three-dimensional coordinates at time points, the information indicating an operational status of a factory facility, and includes a path-data creation unit to create path data on a basis of the three-dimensional coordinates at time points and a received reproduction instruction, the path data describing a command for how to combine information of an image indicating the operational status of the factory facility with the three-dimensional coordinates and display the information.

12 Claims, 14 Drawing Sheets

(56) References Cited

U.S. PATENT DOCUMENTS

| | | | |
|---|---|---|---|
| 9,278,449 B1* | 3/2016 | Linnell | B25J 9/1674 |
| 2003/0016141 A1* | 1/2003 | Sudolcan | G06Q 10/087 |
| | | | 340/870.07 |
| 2008/0294275 A1* | 11/2008 | Reichard | G05B 19/042 |
| | | | 700/88 |
| 2008/0307304 A1* | 12/2008 | Feiler | G11B 27/28 |
| | | | 715/700 |
| 2012/0330452 A1* | 12/2012 | Guenther | G05B 19/41875 |
| | | | 700/110 |
| 2018/0039720 A1* | 2/2018 | Nagatsuka | G06F 30/20 |
| 2018/0286723 A1* | 10/2018 | Fujiki | G06F 3/04847 |

FOREIGN PATENT DOCUMENTS

| | | |
|---|---|---|
| JP | 2000-132214 A | 5/2000 |
| JP | 2000-250775 A | 9/2000 |
| JP | 2000-259239 A | 9/2000 |
| JP | 2008-217608 A | 9/2008 |
| JP | 2013-222258 A | 10/2013 |
| WO | 2016/189704 A1 | 12/2016 |

OTHER PUBLICATIONS

Notification of Reasons for Refusal received for Japanese Patent Application No. 2018-530932, dated Aug. 21, 2018, 6 pages including English Translation.

Notification of Decision to Grant a Patent received for Japanese Patent Application No. 2018-530932, dated Oct. 2, 2018, 5 pages including English Translation.

Office Action dated Dec. 15, 2020, in corresponding Chinese patent Application No. 201780095495.2, 9 pages.

* cited by examiner

MONITORING SYSTEM AND MONITORING METHOD

CROSS-REFERENCE TO RELATED APPLICATIONS

The present application is based on PCT filing PCT/JP2017/036381, filed Oct. 5, 2017, the entire contents of which are incorporated herein by reference.

FIELD

The present invention relates to a monitoring system and a monitoring method for maintenance of a factory facility.

BACKGROUND

A conventional monitoring device constituted by a monitoring camera performs recording in only one direction from the monitoring camera. It is thus impossible to reproduce a detailed motion at a blind spot from the monitoring camera at the production site. Accordingly, there is a problem in that when a trouble has occurred in a production device such as a robot, a substantial amount of time is required to identify the cause of the trouble, or it is difficult to identify the cause of the trouble. When a user is notified of the trouble from the monitoring device, the user needs to visit the production site to replicate and check the trouble, and then identify the cause in order to resolve the trouble.

Patent Literature 1 proposes a system in which two robot control devices and one monitor device are connected to draw motion statuses of two robots on a display screen of the monitor device in a real-time manner so as to replicate motion statuses of the robots. Specifically, the monitor device cyclically collects a present value of joint angles of the robots from a joint-angle server on the robot control devices through a communication network, and updates drawing data of the robots.

CITATION LIST

Patent Literature

Patent Literature 1: Japanese Patent Application Laid-open No. H7-64618

SUMMARY

Technical Problem

However, the system proposed in Patent Literature 1 aims to monitor motion statuses of the robots, and thus collects only present values of joint angles of the robots to perform simulation. Therefore, the system enables review of the simulation of the robot motion using the present values of joint angles. However, the system cannot realistically simulate a trouble occurring under the condition that the facility is in operation, such as a collision between a robot and a delivered article on a belt conveyor. Accordingly, the system cannot deal with the trouble through use of simulation.

The present invention has been achieved to solve the above problems, and an object of the present invention is to provide a monitoring system and a monitoring method that make it possible to simulate an operational status of a factory facility including a production device.

Solution to Problem

An aspect of the present invention obtains information of three-dimensional coordinates at time points, the information indicating an operational status of a factory facility. The present invention further includes a path-data creation unit to create path data on a basis of the three-dimensional coordinates at time points and a received reproduction instruction, the path data describing a command for how to combine information of an image indicating the operational status of the factory facility with the three-dimensional coordinates and display the information.

Advantageous Effects of Invention

The monitoring device according to the present invention has an effect where it is possible to simulate an operational status of a factory facility including a production device.

DESCRIPTION OF EMBODIMENT

An exemplary embodiment of a monitoring system and a monitoring method according to the present invention will be explained below in detail with reference to the accompanying drawings. The present invention is not limited to the embodiment.

First Embodiment

Figure 1:
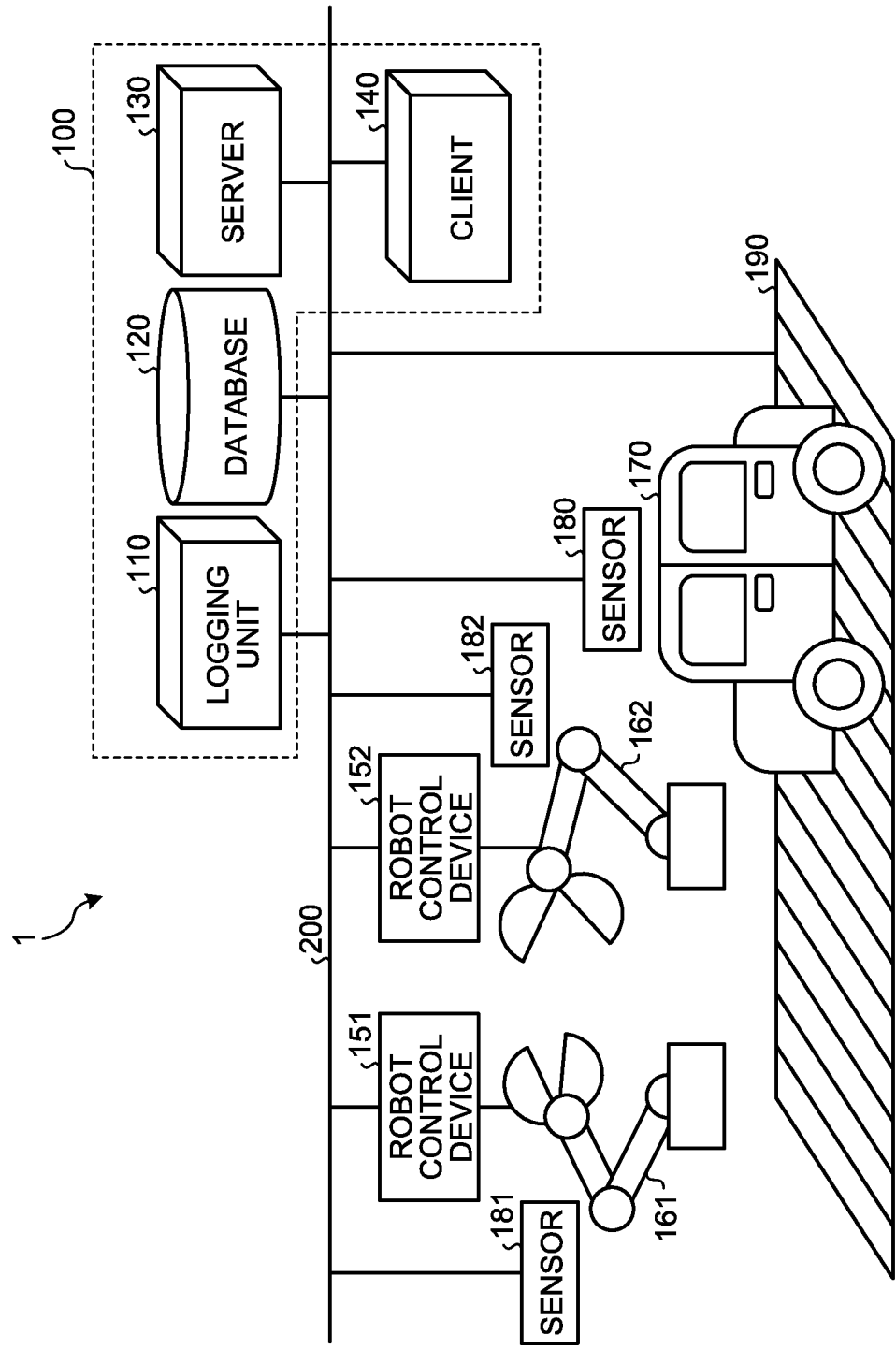
FIG. 1 is a block diagram illustrating a configuration of a factory facility according to a first embodiment of the present invention.

FIG. 1 is a block diagram illustrating a configuration of a factory facility 1 according to a first embodiment of the present invention. The factory facility 1 according to the first embodiment includes a belt conveyor 190 that is a delivery device serving as a production line, robots 161 and 162 that are production devices, and robot control devices 151 and 152 that are control devices for the production devices. The belt conveyor 190 delivers a workpiece 170 that is a delivered article. FIG. 1 illustrates an automobile as an example of the workpiece 170 to be handled in the factory facility 1. The robots 161 and 162 that conduct work on the workpiece 170 are connected respectively to the robot control devices 151 and 152 that control the robots 161 and 162, respectively. The factory facility 1 is further provided with a sensor 180 that detects the position of the workpiece 170, a sensor 181 that detects the temperature of the robot 161, and a sensor 182 that detects the temperature of the robot 162. The temperature of the robots 161 and 162 is specifically a temperature of each shaft equivalent to each joint of a robot arm constituting the robots 161 and 162. The robot control devices 151 and 152, the sensors 180, 181, and 182, and the belt conveyor 190 are connected to a network 200. It is allowable that the network 200 is either a wired network or a wireless network.

A monitoring system 100 that monitors the state of the robots 161 and 162 and the state of the workpiece 170 is provided in the factory facility 1. The monitoring system 100 includes a logging unit 110 having a logging function, a database 120 that is held in a storage device, a server 130 that is a monitoring device, and a client 140 that is a client device that displays a moving image simulating a motion in the factory facility 1. The client 140 simulates and displays a motion of a three-dimensional shape in the factory facility 1. The logging unit 110, the database 120, the server 130, and the client 140 are connected to the network 200. The logging unit 110, the server 130, and the client 140 are implemented by a computer. It is allowable that the logging unit 110 and the server 130 are implemented by separate computers. However, it is also allowable that the functions of both the logging unit 110 and the server 130 are implemented by a single computer. On the basis of data obtained from the server 130, the client 140 simulates and displays a motion of a three-dimensional shape at the production site in the factory facility 1.

The logging unit 110 obtains information of three-dimensional coordinates at time points through the network 200, the information indicating the operational status of the factory facility 1 including the production device. The factory facility 1 also includes the belt conveyor 190 in addition to the robots 161 and 162. The operational status of the factory facility 1 also includes the status of the workpiece 170. Therefore, the logging unit 110 collects data, specifically, the position and the angle of each shaft of the robots 161 and 162, the speed of the belt conveyor 190, and the position of the workpiece 170, along with time information at a regular cycle. The logging unit 110 transfers the collected data described above to the database 120 via the network 200 and saves the collected data in the database 120. The server 130 accesses the database 120 to obtain necessary data. The client 140 requests the server 130 to provide data needed to reproduce the motion of the production device and the production line.

Figure 2:
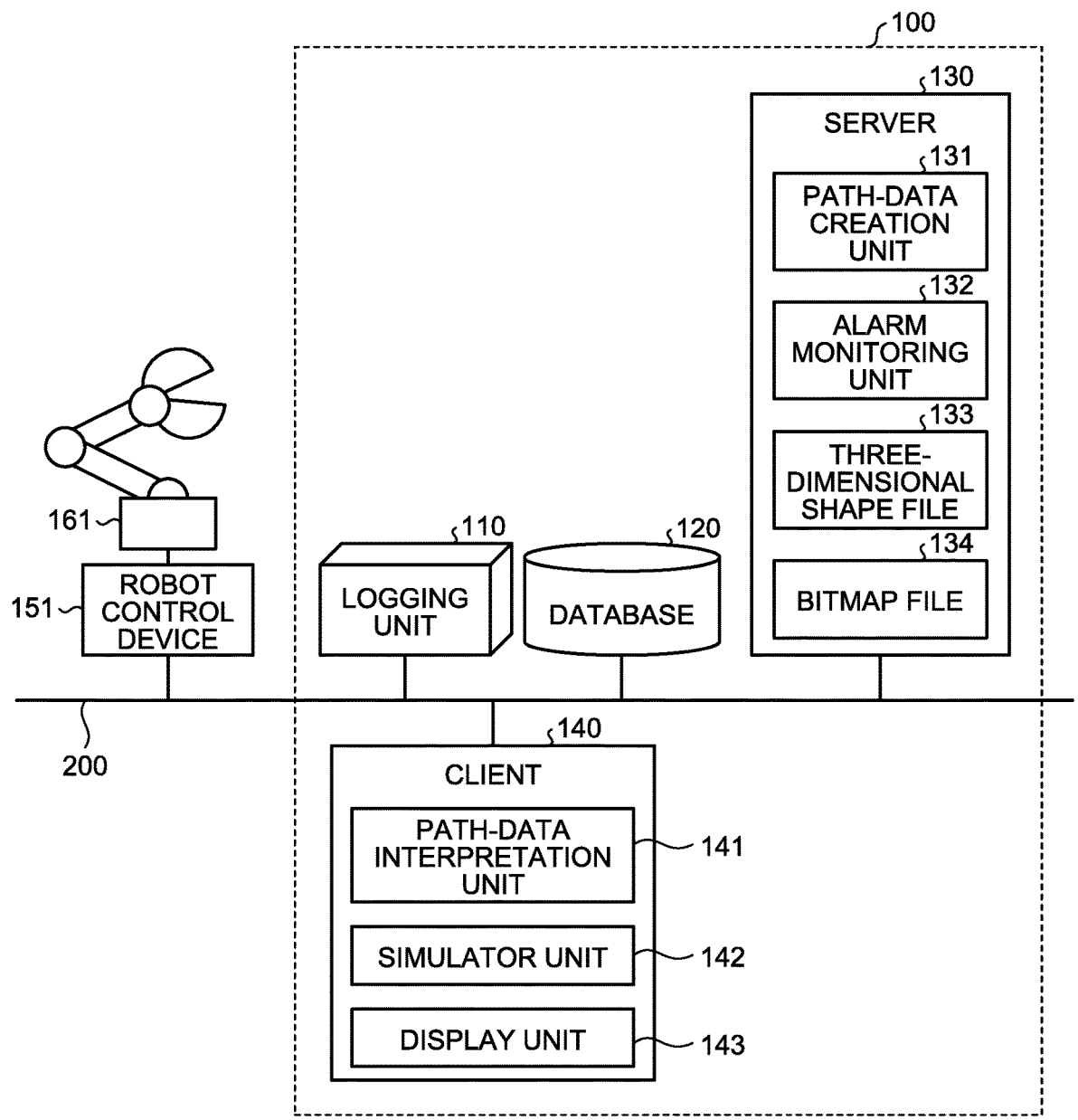
FIG. 2 is a block diagram illustrating a detailed configuration of a monitoring system according to the first embodiment.
Figure 3:
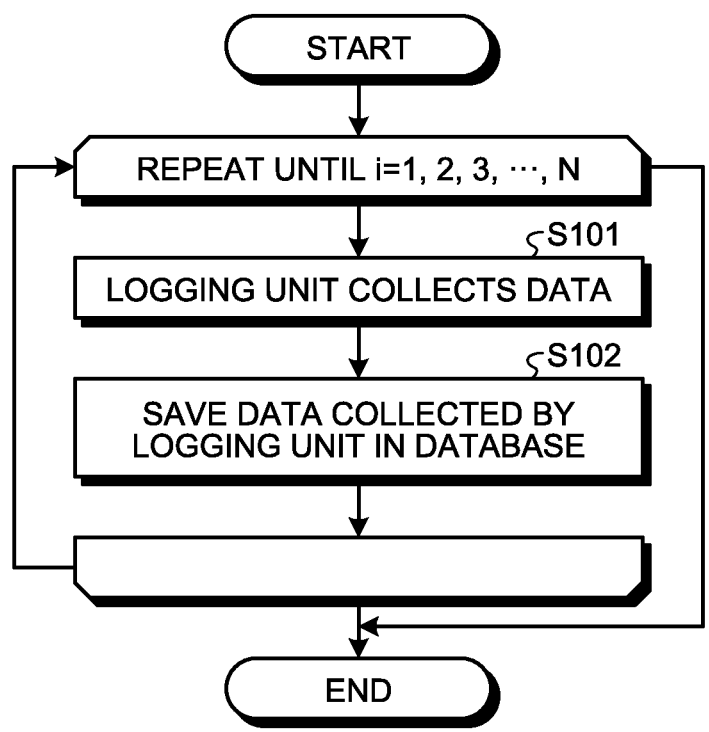
FIG. 3 is a flowchart for explaining an operation of a logging unit according to the first embodiment.

FIG. 2 is a block diagram illustrating a detailed configuration of the monitoring system 100 according to the first embodiment. FIG. 3 is a flowchart for explaining an operation of the logging unit 110 according to the first embodiment. FIG. 2 omits illustrations of a part of the constituent elements in FIG. 1 for simplicity.

Where the cycle at which the logging unit 110 collects information is set as a time unit, the operational period of the factory facility 1 is defined as N cycles. At a given timing, the logging unit 110 collects data from the robot control devices 151 and 152, the belt conveyor 190, and the sensors 180, 181, and 182 (Step S101). Specifically, the logging unit 110 collects data, such as the position and the angle of each shaft of the robots 161 and 162 from the robot control devices 151 and 152, the speed of the belt conveyor 190 from the belt conveyor 190, the position of the workpiece 170 from the sensor 180, and the temperature of the robots 161 and 162 from the sensors 181 and 182, along with time information through the network 200. It is allowable that the data collected by the logging unit 110 through the network 200 further includes the motion speed of each shaft of the robots 161 and 162, and the temperature at the production site where the production line and the production device are installed.

The logging unit 110 saves the collected data described above in the database 120 at each time point (Step S102). Where i=1, 2, 3, . . . , N, the logging unit 110 repeats Step S101 and Step S102 N times beginning with i=1 until i=N. Due to this operation, the logging unit 110 can obtain the position and the angle of each shaft of the robots 161 and 162, the speed of the belt conveyor 190, the position of the workpiece 170, and the temperature of the robots 161 and 162 at a regular cycle, and can save the obtained data along with time information in the database 120. There is a case where the absolute value of the difference between a data value collected at a certain timing and a data value collected at the immediately previous cycle to the certain timing is greater than a predetermined value. In this case, the logging unit 110 determines that noise is superimposed on the data collected at the certain timing, and thus discards this data without saving it in the database 120.

The server 130 includes a path-data creation unit 131 that creates path data for a three-dimensional path of the factory facility 1 in response to a request from the client 140, an alarm monitoring unit 132 that obtains alarm information to notify to the client 140, a three-dimensional shape file 133 on the basis of information obtained from the database 120, and a bitmap file 134 that is image data. The path-data creation unit 131 creates a script or a script file including the path data. As described later, the script is a data file in which the path data and other data are described, while only the path data is described in the script file.

The three-dimensional shape file 133 is a file having information of three-dimensional coordinates indicating the operational status of the factory facility 1 including the production device. Specifically, the three-dimensional shape file 133 is data including the three-dimensional space position data of each shaft of the robots 161 and 162, and the three-dimensional space position data of the workpiece 170 on the belt conveyor 190. The three-dimensional shape file 133 includes information of three-dimensional coordinates of a point group constituting the framework or the contour of the robots 161 and 162 and the workpiece 170 for displaying the robots 161 and 162 and the workpiece 170 in the three-dimensional space. As described above, the logging unit 110 obtains the data of the three-dimensional coordinates of each shaft of the robots 161 and 162 from control programs for controlling the robots 161 and 162 held in the robot control devices 151 and 152, respectively. The obtained data is saved along with time information in the database 120 at a regular cycle. The logging unit 110 also obtains the data of the three-dimensional coordinates of the workpiece 170 on the belt conveyor 190 from the sensor 180 or the belt conveyor 190. The obtained data is saved along with time in the database 120 at a regular cycle. The client 140 accesses the database 120 to create the three-dimensional shape file 133 at each time point on the basis of the above data saved in the database 120, and saves the created three-dimensional shape file 133 in its own storage device. The file format for the three-dimensional shape file 133 conforms to AutoCAD(registered trademarks), SOLIDWORKS(registered trademarks), or iCAD(registered trademarks) data format. Thus, the three-dimensional shape file 133 is readable by AutoCAD(registered trademarks), SOLIDWORKS(registered trademarks), or iCAD(registered trademarks). Therefore, the three-dimensional shape file 133 may be in a JT file format, or in a three-dimensional file format such as Parasolid, IGES (Initial Graphics Exchange Specification), STEP, STL (Standard Triangulated Language), VPS, VRML (Virtual Reality Modeling Language), CATIA V5 (Computer graphics Aided Three dimensional Interactive Application V5), Pro/E, NX, or I-deas. The file format for the three-dimensional shape file 133 is not limited to the existing formats as described above, but may be a unique or a new file format.

The bitmap file 134 is a file having image information indicating the operational status of the factory facility 1 including the production device. Specifically, the bitmap file 134 is a file illustrating image information of the robots 161 and 162 and the workpiece 170, which is needed to draw the robots 161 and 162 and the workpiece 170 in the three-dimensional space by adding more details to the framework or the contour illustrated by the three-dimensional shape file 133. That is, the bitmap file 134 is information of an image to be pasted on the three-dimensional space along the point group illustrated by the three-dimensional shape file 133. The file format for the bitmap file 134 conforms to AutoCAD(registered trademarks), SOLIDWORKS(registered trademarks), or iCAD(registered trademarks) data format. Thus, the bitmap file 134 is readable by AutoCAD(registered trademarks), SOLIDWORKS(registered trademarks), or iCAD(registered trademarks). Therefore, the bitmap file 134 may be in a file format such as DXF (Drawing Exchange Format), DWG, ME-10, IGES, MicroCADAM drawing, DMNDOS, MCD, or BMI file format. DWG is the standard file format for AutoCAD(registered trademarks). The file format for the bitmap file 134 is not limited to the existing formats as described above, but may be a unique or a new file format.

The client 140 includes a path-data interpretation unit 141 that interprets path data included in a script or a script file obtained from the server 130, a simulator unit 142 that performs simulation of a motion of a three-dimensional shape in the factory facility 1 on the basis of a result of the interpretation in the path-data interpretation unit 141, and a display unit 143 that displays a result of the simulation of the motion of the three-dimensional shape performed by the simulator unit 142.

Figure 4:
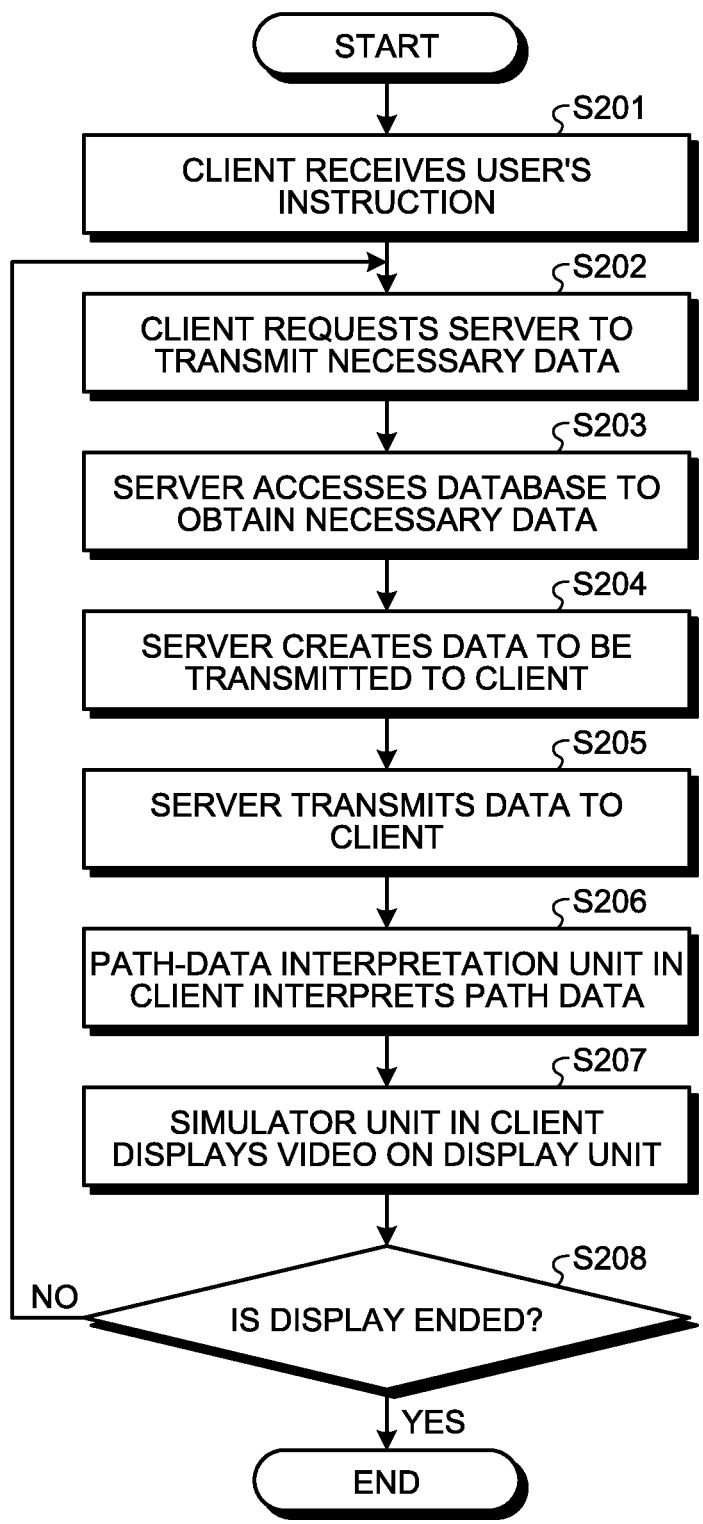
FIG. 4 is a flowchart for explaining processes in a client and a server according to the first embodiment.
Figure 5:
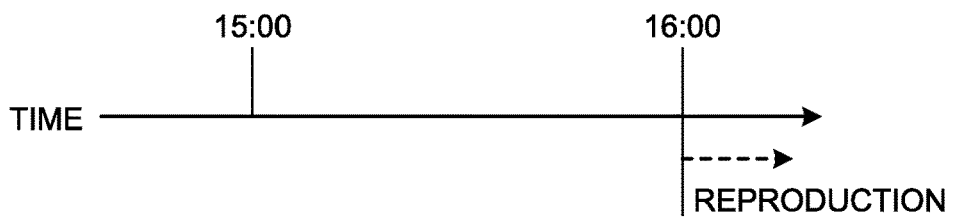
FIG. 5 is an explanatory diagram of "real-time reproduction" according to the first embodiment.
Figure 6:
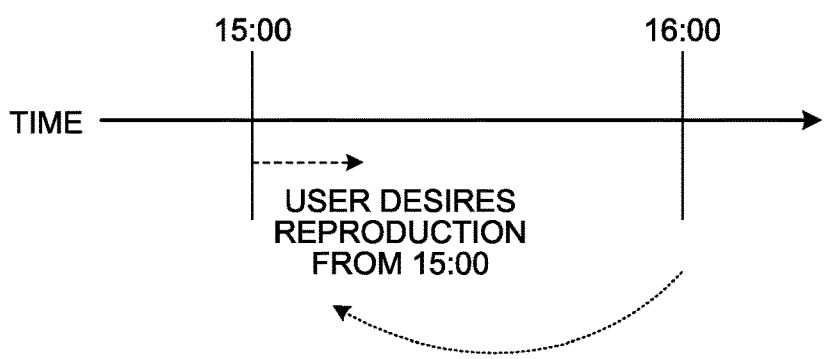
FIG. 6 is an explanatory diagram of "normal reproduction" according to the first embodiment.
Figure 7:
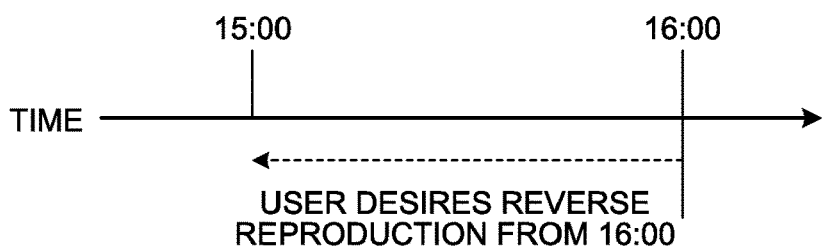
FIG. 7 is an explanatory diagram of "reverse reproduction" according to the first embodiment.
Figure 8:
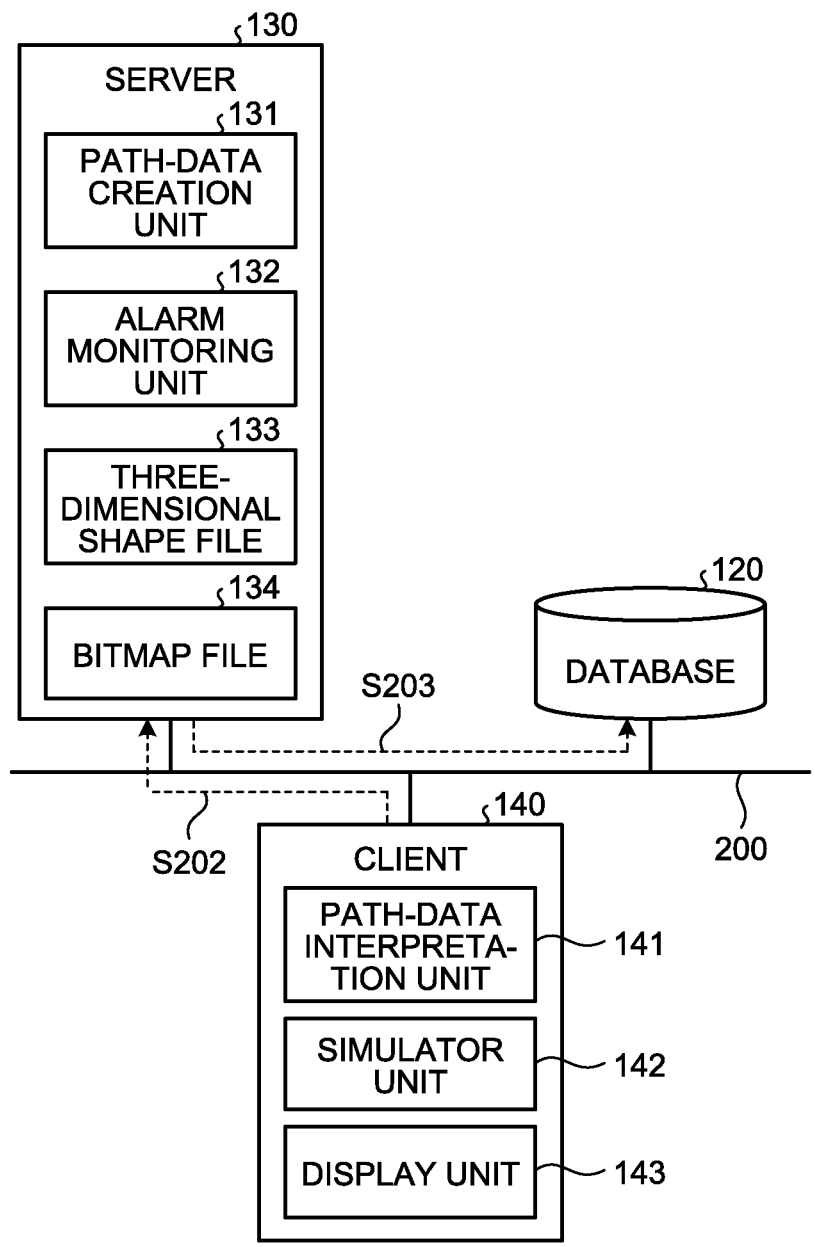
FIG. 8 is an explanatory diagram of process flow in the client and the server according to the first embodiment.
Figure 9:
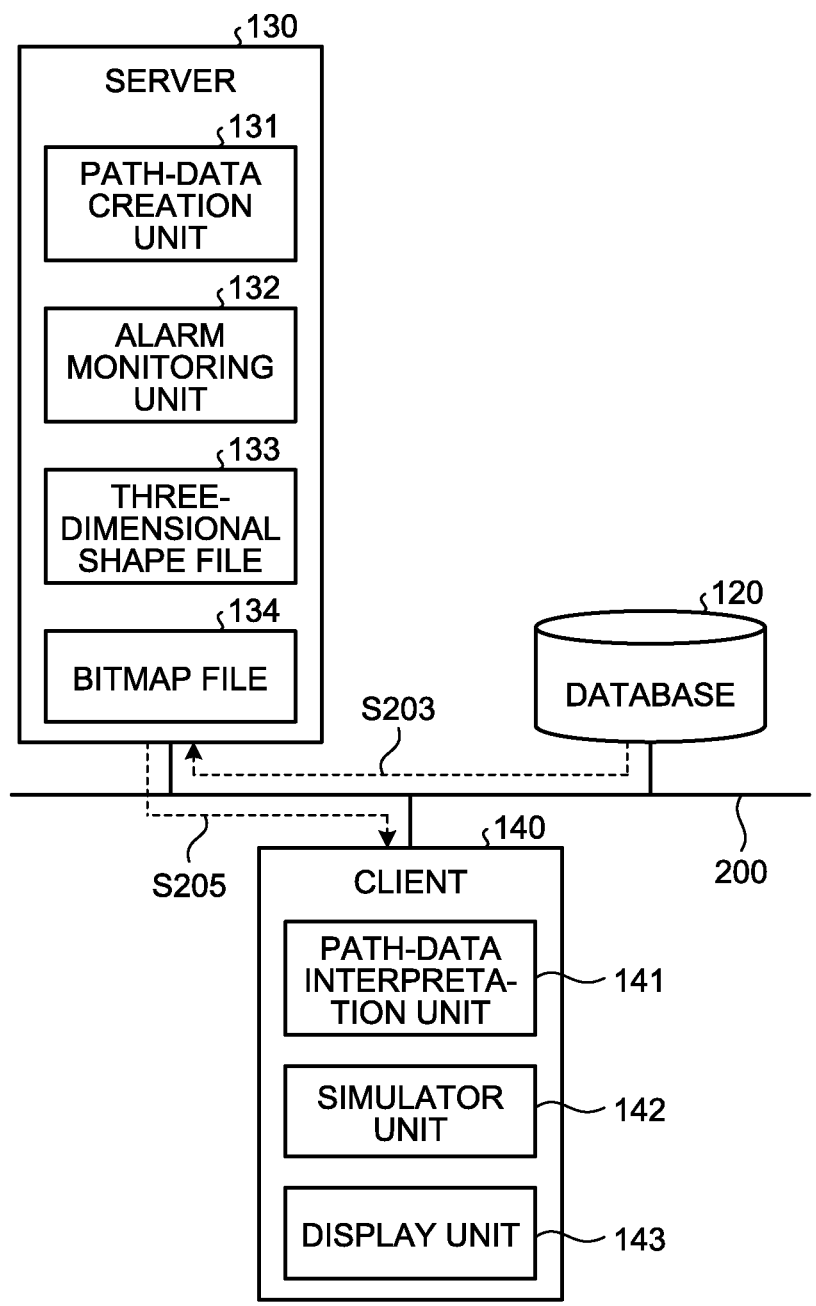
FIG. 9 is another explanatory diagram of process flow in the client and the server according to the first embodiment.
Figure 10:
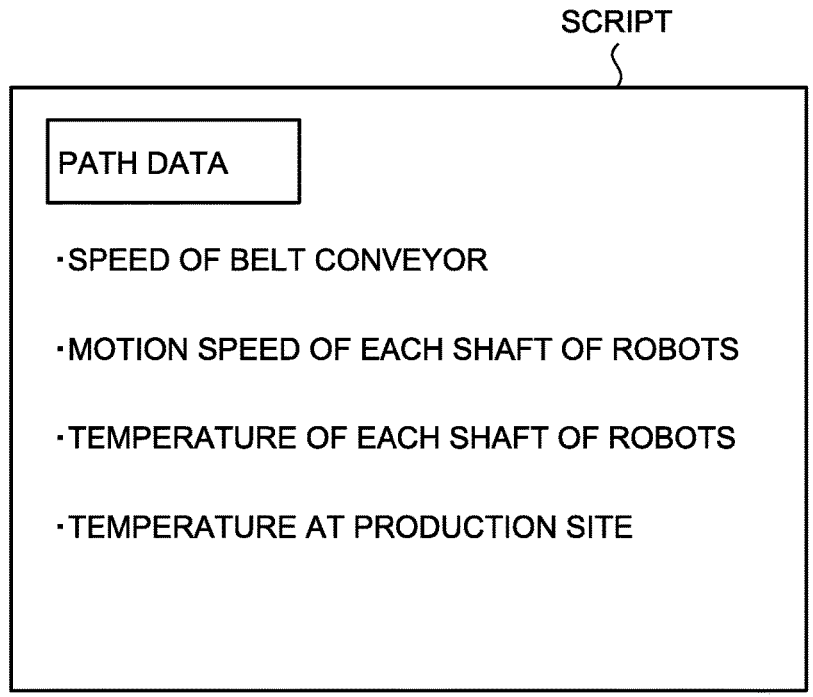
FIG. 10 is a diagram illustrating a configuration of a script according to the first embodiment.
Figure 11:
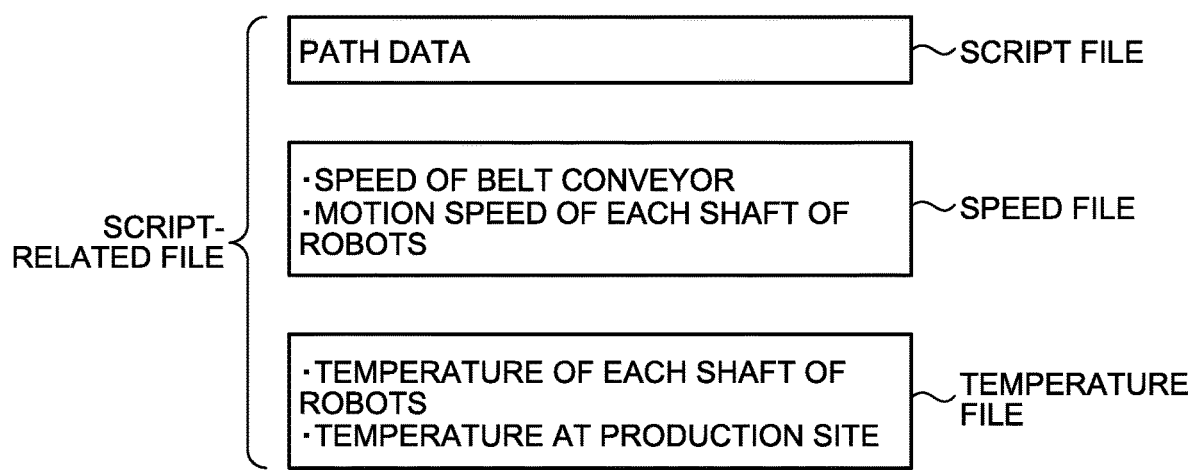
FIG. 11 is a diagram illustrating a configuration of a script-related file according to the first embodiment.
Figure 12:
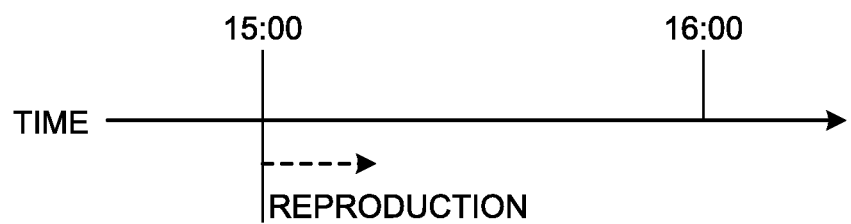
FIG. 12 is an explanatory diagram of execution of "normal reproduction" according to the first embodiment.
Figure 13:
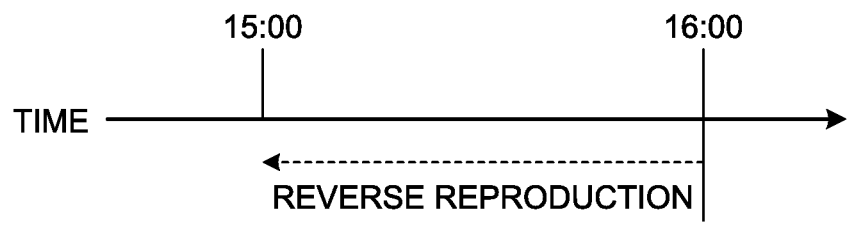
FIG. 13 is an explanatory diagram of execution of "reverse reproduction" according to the first embodiment.
Figure 14:
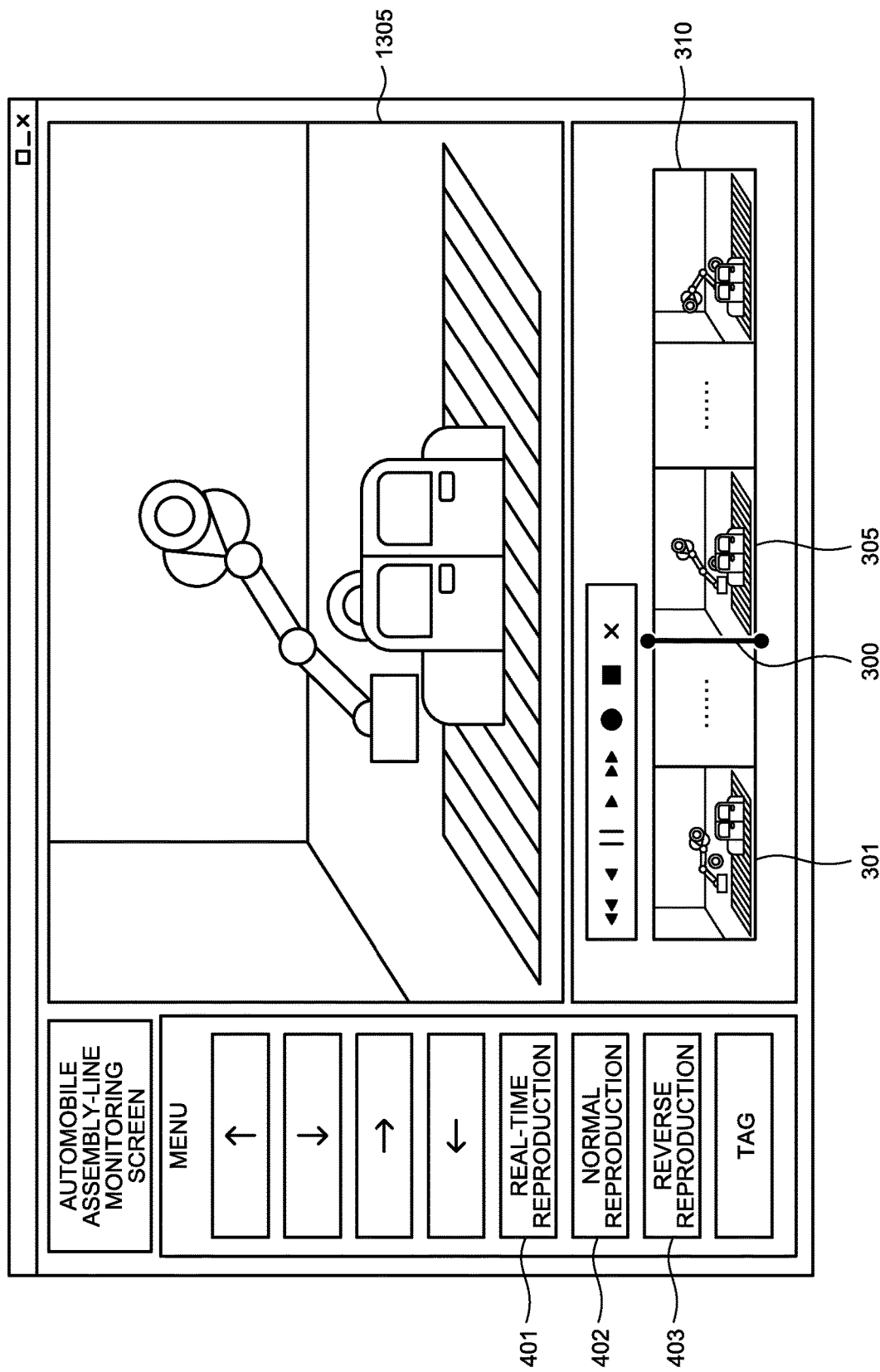
FIG. 14 is a diagram illustrating a screen of a display unit during execution of "normal reproduction" according to the first embodiment.

FIG. 4 is a flowchart for explaining the processes in the client 140 and the server 130 according to the first embodiment. FIG. 5 is an explanatory diagram of "real-time reproduction" according to the first embodiment. FIG. 6 is an explanatory diagram of "normal reproduction" according to the first embodiment. FIG. 7 is an explanatory diagram of "reverse reproduction" according to the first embodiment. FIG. 8 is an explanatory diagram of process flow in the client 140 and the server 130 according to the first embodiment. FIG. 9 is another explanatory diagram of process flow in the client 140 and the server 130 according to the first embodiment. FIG. 10 is a diagram illustrating a configuration of a script according to the first embodiment. FIG. 11 is a diagram illustrating a configuration of a script-related file according to the first embodiment. FIG. 12 is an explanatory diagram of execution of "normal reproduction" according to the first embodiment. FIG. 13 is an explanatory diagram of execution of "reverse reproduction" according to the first embodiment. FIG. 14 is a diagram illustrating a screen of the display unit during execution of "normal reproduction" according to the first embodiment.

The processes in the client 140 and the server 130 according to the first embodiment are described below.

First, a user issues an instruction for either reproduction or reverse reproduction. An input device of the client 140 receives the user's instruction (Step S201 in FIG. 4). Specifically, a user issues an instruction for any of "real-time reproduction", "normal reproduction", or "reverse reproduction", and then the input device of the client 140 receives the instruction.

When a user issues an instruction for "real-time reproduction", the user desires to reproduce the current and subsequent motion of the three-dimensional shape in the factory facility 1. When the current time is 16:00, the user desires reproduction as illustrated in FIG. 5.

When a user issues an instruction for "normal reproduction", it means that the user desires to reproduce the motion of the three-dimensional shape in the factory facility 1 from a user-desired past reproduction time. Accordingly, the user also specifies the reproduction time. When the current time is 16:00 and the user specifies the reproduction time from 15:00, then the user desires reproduction as illustrated in FIG. 6.

When a user issues an instruction for "reverse reproduction", it means that the user desires to reversely reproduce the motion of the three-dimensional shape in the factory facility 1 from a user-desired reverse-reproduction time. Accordingly, the user also specifies the reverse-reproduction time. When the current time is 16:00 and the reverse-reproduction time is also 16:00, the user desires reverse reproduction as illustrated in FIG. 7.

After Step S201, the client 140 requests the server 130 to transmit necessary data (Step S202 in FIG. 4 and FIG. 8). At this time, the client 140 notifies the server 130 of any of the instructions for "real-time reproduction", "normal reproduction", or "reverse reproduction", which the client 140 has received at Step S201, and also notifies the server 130 of a set period in accordance with the received instruction. The client 140 also requests the server 130 to transmit data for the set period. The set period in accordance with the instruction is a unit of time for a set of data to be transferred for "real-time reproduction", "normal reproduction", or "reverse reproduction". It is also allowable that the server 130 holds therein a set period in accordance with "real-time reproduction", "normal reproduction", or "reverse reproduction", from the beginning. As a specific example of the set period, the period for "real-time reproduction" is set to one second, while the period for "normal reproduction" or for "reverse reproduction" is set to five seconds. Whichever instruction the client 140 receives, that is, "real-time reproduction", "normal reproduction", or "reverse reproduction", Step S202 to Step S207 described later are repeatedly performed regularly on the basis of the set period described above. Accordingly, Step S202 at which the client 140 makes a request to the server 130 is regularly performed.

The server 130 having received the request from the client 140 accesses the database 120 to obtain necessary data (Step S203 in FIG. 4, FIG. 8, and FIG. 9). The necessary data is information of the three-dimensional coordinates at time points, the information indicating the operational status of the factory facility 1 including the robots 161 and 162. The necessary data includes the three-dimensional space position data of each shaft of the robots 161 and 162 at time points, and the three-dimensional space position data of the workpiece 170 on the belt conveyor 190 at time points, both the position data being necessary for the server 130 to create the three-dimensional shape file 133. The necessary data further includes the speed data of the belt conveyor 190 at time points. It is also allowable that data obtained from the database 120 by the server 130 at Step S203 includes the temperature of the robots 161 and 162 at time points, the angle and the motion speed of each shaft of the robots 161 and 162 at time points, and the temperature at the production site at time points. The data obtained by the server 130 from the database 120 at Step S203 is the data for a set period in accordance with the instruction for "real-time reproduction", "normal reproduction", or "reverse reproduction" received by the client 140 as described above.

Next, the server 130 uses the data obtained from the database 120 to create data to be transmitted to the client 140 (Step S204 in FIG. 4). Specifically, the server 130 creates the three-dimensional shape file 133 at time points on the basis of the three-dimensional space position data of each shaft of the robots 161 and 162, and the three-dimensional space position data of the workpiece 170 on the belt conveyor 190, both the position data being obtained from the database 120 as described above. Further, on the basis of any of the instructions for "real-time reproduction", "normal reproduction", or "reverse reproduction" received by the client 140, on the basis of a set period in accordance with the received instruction, and on the basis of the three-dimensional shape file 133 created, the path-data creation unit 131 in the server 130 creates path data. The path data describes a command for how to combine images of the bitmap file 134 with the three-dimensional coordinates illustrated by the point group of the three-dimensional shape file 133 at time points to display the images continuously in time series. It is allowable that the server 130 refers to the angle and the motion speed of each shaft of the robots 161 and 162 when the server 130 creates path data. By referring to the angle and the motion speed of each shaft of the robots 161 and 162, the path-data creation unit 131 in the server 130 can create path data that more accurately reproduces the motion of each shaft of the robots 161 and 162. By referring to the temperature at the production site at time points, the path-data creation unit 131 can create path data in consideration of the influence of the temperature on the robots 161 and 162.

When the server 130 transmits path data to the client 140, the path-data creation unit 131 creates a script that is a single data file as illustrated in FIG. 10. In the script in FIG. 10, in addition to the path data, pieces of information are described such as the speed of the belt conveyor 190, the motion speed of each shaft of the robots 161 and 162, the temperature of each shaft of the robots 161 and 162, and the temperature at the production site. That is, the script includes necessary information for the client 140 to simulate the operational status of the factory facility 1.

When the server 130 transmits path data to the client 140, it is allowable to transmit the path data and other information such as the speed of the belt conveyor 190 in separate files. Specifically, as illustrated in FIG. 11, the path data is described in a script file, the speed of the belt conveyor 190 and the motion speed of each shaft of the robots 161 and 162 are described in a speed file, and the temperature of each shaft of the robots 161 and 162 and the temperature at the production site are described in a temperature file. The path-data creation unit 131 in the server 130 creates a script file in which only path data is described. Further, the server 130 uses data obtained from the database 120 to create a speed file and a temperature file. A script-related file is categorized into a script file including path data and a file including information obtained from the database 120. However, the configurations of files other than the script file are not limited to the configuration illustrated in FIG. 11.

The server 130 transmits the data to the client 140 (Step S205 in FIG. 4 and FIG. 9). As a first method to transmit the data from the server 130 to the client 140, the server 130 transmits the three-dimensional shape file 133, the bitmap file 134, and the script illustrated in FIG. 10 at time points for a set period, to the client 140. As a second method to transmit the data from the server 130 to the client 140, the server 130 transmits the three-dimensional shape file 133 and the bitmap file 134 as well as the script file, the speed file, and the temperature file which are illustrated in FIG. 11 at time points for a set period, to the client 140. It is allowable that the monitoring system 100 employs either of the above methods as a method to transmit data from the server 130 to the client 140.

The path-data interpretation unit 141 in the client 140 having received the data including the path data from the server 130 then interprets the path data (Step S206 in FIG. 4). Specifically, on the basis of any of the instructions for "real-time reproduction", "normal reproduction", or "reverse reproduction" received by the client 140, the path-data interpretation unit 141 interprets the path data included in the script or the script file, combines images in the bitmap file 134 with the three-dimensional coordinates illustrated by the point group of the three-dimensional shape file 133 at time points, and creates image data for each screen to be continuously displayed in time series. The path-data interpretation unit 141 also refers to the speed of the belt conveyor 190 received from the server 130 at the time of creating the image data. It is allowable that the path-data interpretation unit 141 further refers to the angle and the motion speed of each shaft of the robots 161 and 162 at the time of creating the image data. It is further allowable that the path-data interpretation unit 141 represents the temperature of each shaft of the robots 161 and 162 and the temperature at the production site by using a numerical value or a color at the time of creating the image data. Due to the operation described above, the path-data interpretation unit 141 can create image data simulating not only the robots 161 and 162, but also the workpiece 170 and the belt conveyor 190. The path-data interpretation unit 141 creates image data for each screen so as to provide a moving image constituted by three-dimensional graphics that simulate the robots 161 and 162, the workpiece 170, and the belt conveyor 190 by means of continuously displaying image data at subdivided time intervals within the set period in accordance with the instruction for "real-time reproduction", "normal reproduction", or "reverse reproduction".

The simulator unit 142 in the client 140 uses the image data created by the path-data interpretation unit 141 to display a video on the display unit 143 (Step S207 in FIG.

4). Specifically, the simulator unit 142 controls the display unit 143 in such a manner as to display the image data created by the path-data interpretation unit 141 at subdivided time intervals within the set period in accordance with the instruction for "real-time reproduction", "normal reproduction", or "reverse reproduction", so that the simulator unit 142 can display a video on the display unit 143 in accordance with the instruction for "real-time reproduction", "normal reproduction", or "reverse reproduction".

When the current time is 16:00, video reproduction in accordance with "real-time reproduction" is performed in the forward direction on the basis of the time as illustrated in FIG. 5. When the reproduction time is specified as 15:00, video reproduction in accordance with "normal reproduction" is performed in the forward direction on the basis of the time as illustrated in FIG. 12. When the current time is 16:00, and also the reverse-reproduction time is 16:00, then video reproduction in accordance with "reverse reproduction" is performed in the reverse direction on the basis of the time as illustrated in FIG. 13.

FIG. 14 illustrates a "real-time reproduction" button 401, a "normal reproduction" button 402, and a "reverse reproduction" button 403 on the left side of the screen. The input device of the client 140 receives user's operation such as clicking of any of the buttons, and thereby Step S201 is performed. FIG. 14 illustrates the state of the screen of the display unit 143 during execution of "normal reproduction" at Step S207 after the input device of the client 140 receives "normal reproduction" at Step S201. In FIG. 14, image data having already been created by the path-data interpretation unit 141 is displayed as thumbnails 301, . . . , 305, . . . , 310. Because a bar 300 is positioned at the thumbnail 305, an enlarged screen of the thumbnail 305 is displayed as a large screen 1305. In this manner, the display unit 143 in the client 140 is capable of simulating and displaying not only the actual motion of the robots 161 and 162, but also the actual motion of the workpiece 170 and the belt conveyor 190. When a user moves the bar 300 during video reproduction, the input device of the client 140 receives the movement of the bar 300. Then, the simulator unit 142 can reproduce the moving image from the enlarged screen of a thumbnail at the time corresponding to the location to which the bar 300 has moved on the display unit 143.

The client 140 determines whether to end the display (Step S208 in FIG. 4). In the "reverse reproduction" case, when the data saved in the database 120 is being currently reproduced reversely up to the initial time, the client 140 determines to end video display on the display unit 143 (YES at Step S208). Upon completion of the reverse reproduction of the data currently obtained, the client 140 ends the display. In other "reverse reproduction" cases aside from the above case, and also in the "real-time reproduction" case and the "normal reproduction" case, the client 140 determines to continue video display on the display unit 143 (NO at Step S208), and then returns to Step S202 to repeat Step S202 to Step S207.

When a user analyzes the cause of a trouble, it is desirable to change the point of view from the user and reproduce a motion of a three-dimensional shape in the factory facility 1. Therefore, when the client 140 is provided with the point-of-view position to the three-dimensional shape of the factory facility 1 in the video displayed on the display unit 143 through the input device, that is, when the client 140 is provided with a direction in which a user views the three-dimensional shape, the client 140 causes the simulator unit 142 to simulate the motion of the three-dimensional shape viewed from the provided point-of-view position. Due to this operation, the simulator unit 142 can display on the display unit 143 a video that simulates the motion of the three-dimensional shape viewed from any user-desired point-of-view position.

As described above, the server 130 according to the first embodiment can simulate the motion of the robots 161 and 162 and the workpiece 170. Therefore, the monitoring system 100 according to the first embodiment can reproduce and display not only the actual motion of the robots 161 and 162, but also the actual motion of the workpiece 170 and the belt conveyor 190 at the actual production site. Accordingly, a trouble such as a collision between the robots 161 and 162 and the workpiece 170 on the belt conveyor 190 can be simulated, and thus a moving image constituted by three-dimensional graphics can be displayed on the client 140 as a video.

Normally, the display unit 143 executes "real-time reproduction" on the basis of user's instruction. However, a user does not always monitor the display unit 143. When a trouble has occurred at a production site, a user may desire to review the motion at the occurrence time of the trouble. In this case, the user can issue an instruction for "normal reproduction" along with a reproduction time, or can issue an instruction for "reverse reproduction" along with a reverse-reproduction time. After having received the instruction, the client 140 collects necessary information from the database 120 via the server 130 to thereby reproduce a moving image simulating the state of the production site from the desired time along the time axis in either the forward direction or the reverse direction on the display unit 143. This makes it possible for the user to check the cause of occurrence of the trouble.

The monitoring system 100 according to the first embodiment 1 reproduces the motion of the three-dimensional graphics on the basis of information obtained from the production site. This makes it possible for the client 140 to easily change the point-of-view position to the three-dimensional graphics simulating the production site. Therefore, unlike the conventional method of monitoring the production site using a video camera, the monitoring system 100 according to the first embodiment does not have a blind spot in the monitoring area. This facilitates maintenance of the factory facility 1. In addition, the amount of necessary information for the monitoring can be reduced significantly as compared to the conventional monitoring method using a video camera. This can also contribute to a reduction in communication traffic.

Figure 15:
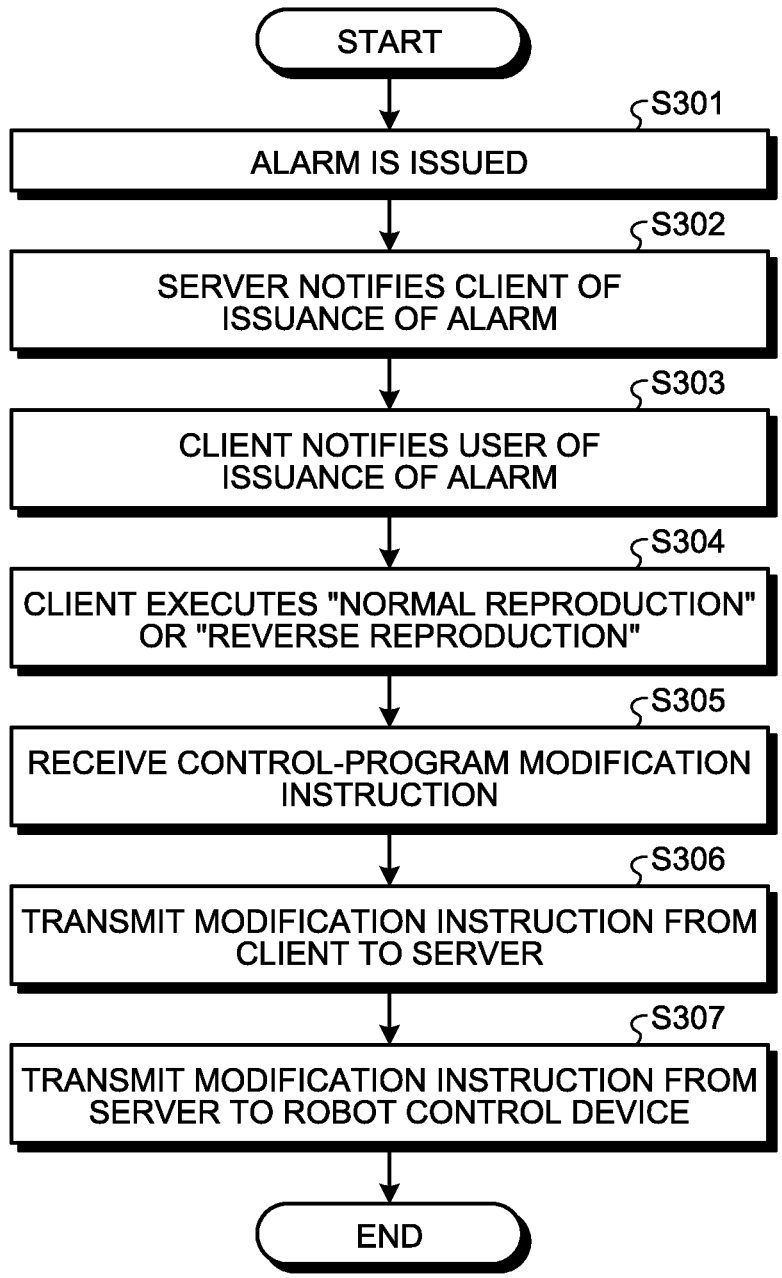
FIG. 15 is a flowchart for explaining processes in the client and the server at the time when a trouble has occurred in the first embodiment.
Figure 16:
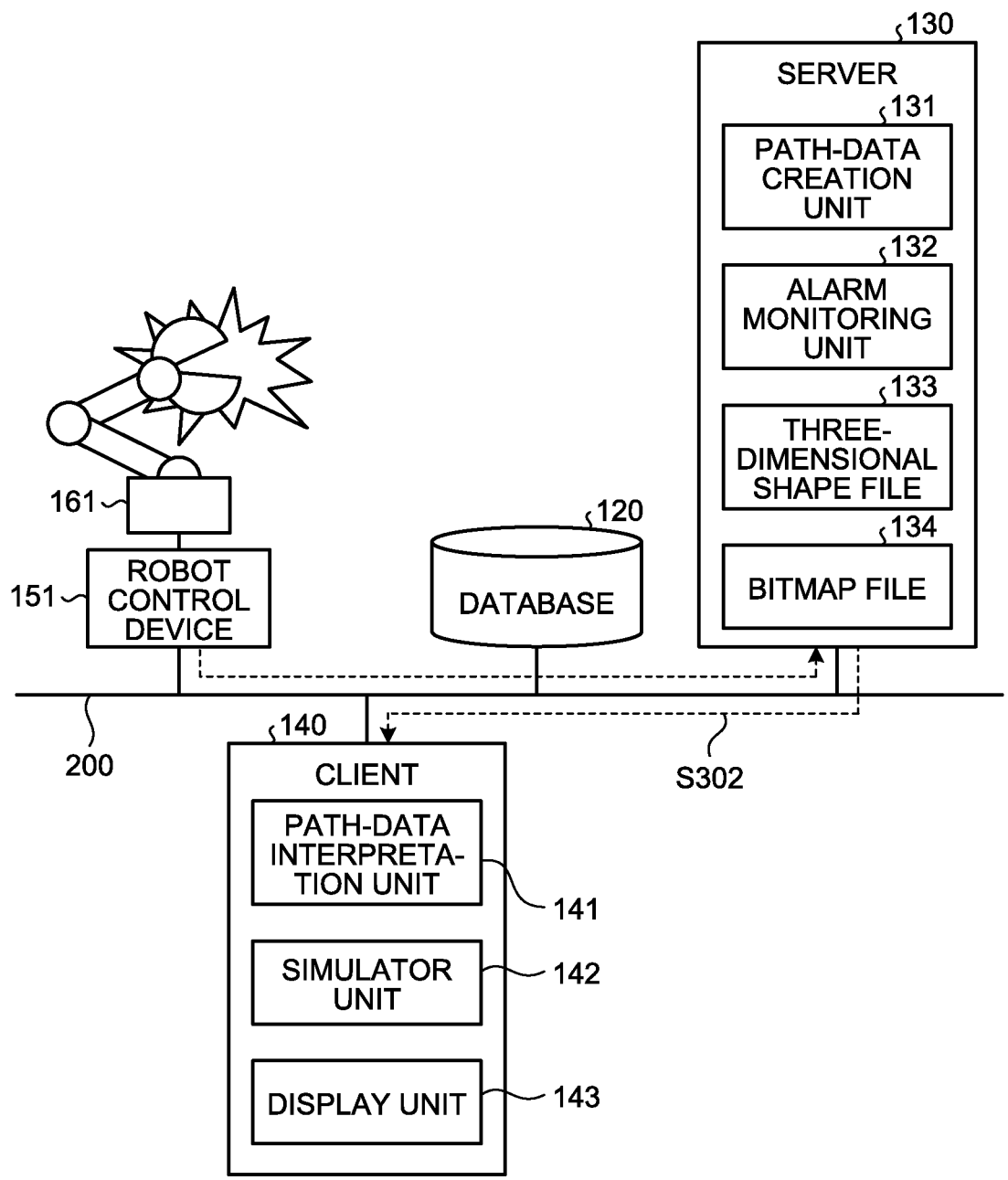
FIG. 16 is an explanatory diagram of process flow in the client and the server at the time when a trouble has occurred in the first embodiment.
Figure 17:
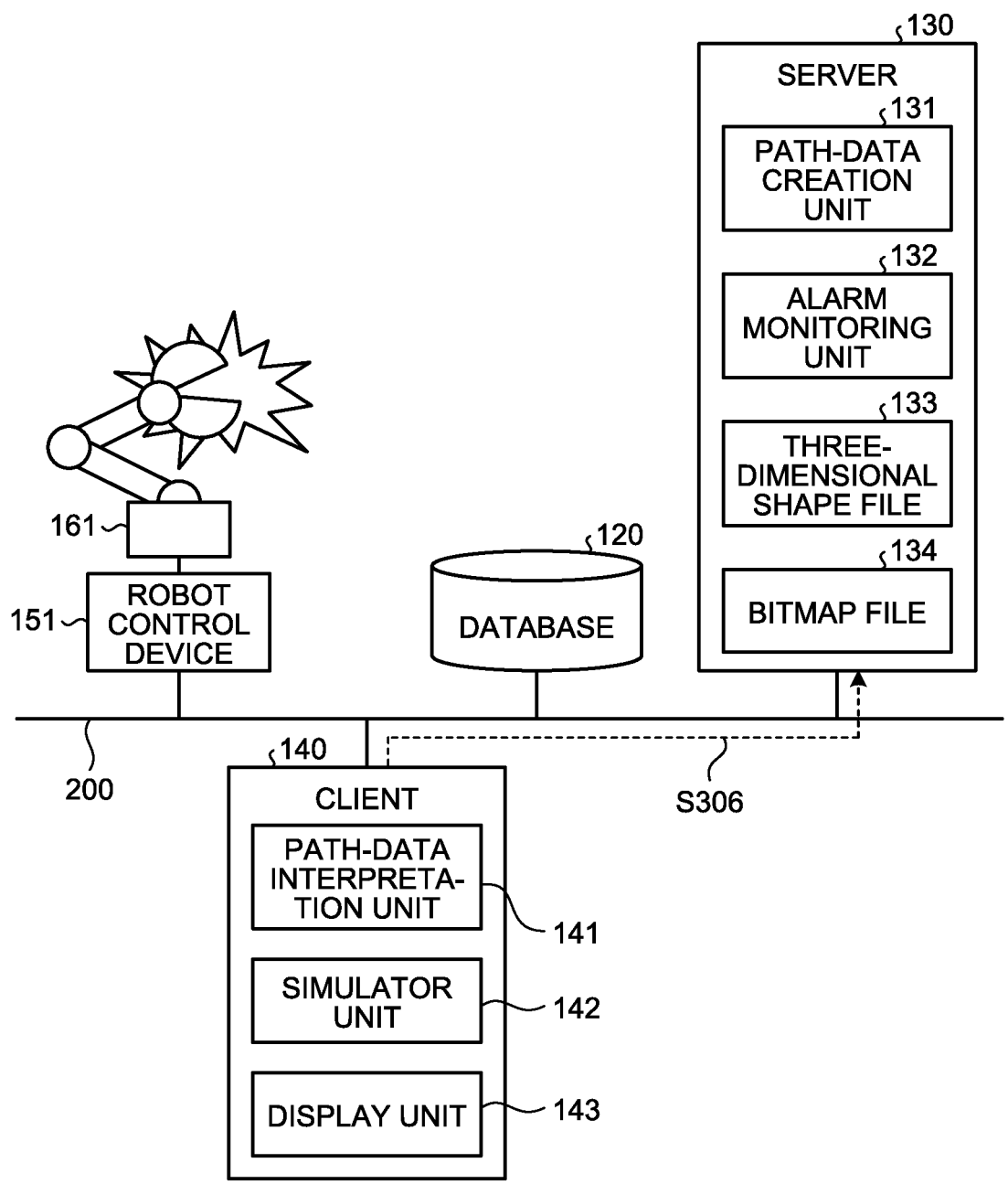
FIG. 17 is an explanatory diagram of process flow in the client at the time of dealing with a trouble in the first embodiment.
Figure 18:
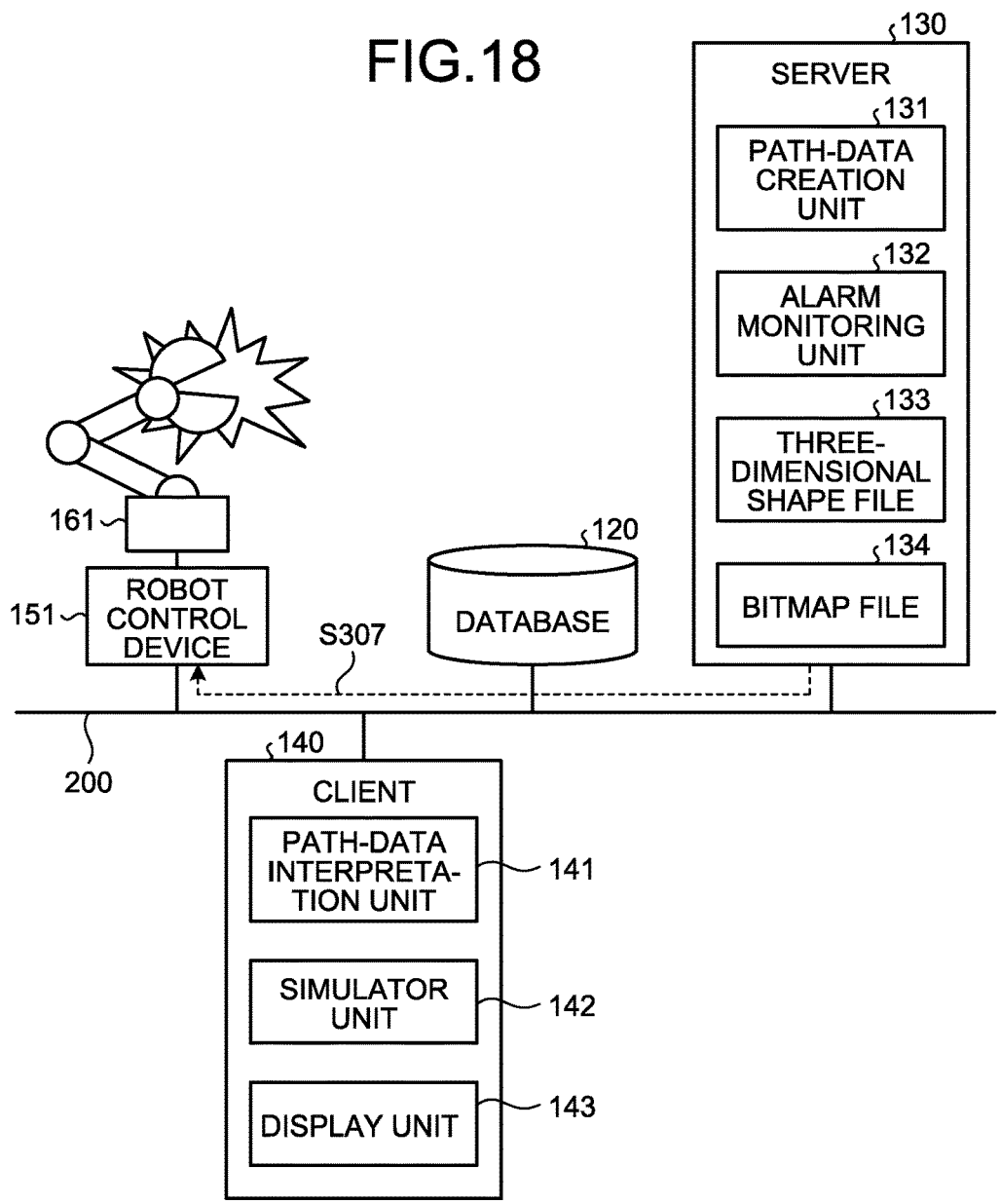
FIG. 18 is an explanatory diagram of process flow in the server at the time of dealing with a trouble in the first embodiment.

In the monitoring system 100 according to the first embodiment, a user can know that a trouble has occurred at the production site through the client 140. Processes in the client 140 and the server 130 at the time when a trouble has occurred and at the time of dealing with the trouble are described below with reference to the drawings. FIG. 15 is a flowchart for explaining the processes in the client 140 and the server 130 at the time when a trouble has occurred in the first embodiment. FIG. 16 is an explanatory diagram of process flow in the client 140 and the server 130 at the time when a trouble has occurred in the first embodiment. FIG. 17 is an explanatory diagram of process flow in the client 140 at the time of dealing with the trouble in the first embodiment. FIG. 18 is an explanatory diagram of process flow in the server 130 at the time of dealing with the trouble in the first embodiment.

First, an alarm is issued when a trouble has occurred such as a collision between the workpiece 170 and the robots 161 and 162 at the production site (Step S301 in FIG. 15). The alarm is issued by a device having detected the trouble, such as the robot control devices 151 and 152 or the belt conveyor 190. The alarm monitoring unit 132 in the server 130 detects alarm information issued by the robot control devices 151 and 152 or the belt conveyor 190 through the network 200, and then notifies the client 140 of the issuance of the alarm (Step S302 in FIG. 15 and FIG. 16). As a specific example, FIG. 16 illustrates a state where the robot control device 151 notifies alarm information to the server 130 through the network 200, while the server 130 notifies the client 140 of the issuance of the alarm through the network 200. The client 140 having been notified of the issuance of the alarm from the server 130 notifies a user of the issuance of the alarm (Step S303 in FIG. 15). As a method of notifying a user of the issuance of an alarm, the client 140 may notify through the display unit 143, or by using voice. The alarm notification method is not limited thereto. At this time, the client 140 may also notify a user of the time of alarm issuance.

A user having been notified of the issuance of the alarm issues an instruction for either "normal reproduction" or "reverse reproduction" by means of clicking the "normal-reproduction" button 402 or the "reverse-reproduction" button 403 in FIG. 14. The input device of the client 140 receives the user's instruction (Step S201 in FIG. 4). When the user has been notified of the time of alarm issuance from the client 140, it is allowable that at Step S201, the user inputs a reproduction time or a reverse-reproduction time with reference to the time of alarm issuance, and then the input device receives the input. The client 140 having received either "normal reproduction" or "reverse reproduction" executes "normal reproduction" or "reverse reproduction" in accordance with the flowchart in FIG. 4 (Step S304 in FIG. 15) to display a video on the display unit 143.

A user having viewed the reproduced moving image can more closely examine the cause of the trouble. In a case where it is difficult to identify the cause of the trouble by "normal reproduction", "reverse reproduction" may make it easier to identify the cause. When the trouble is a collision between the workpiece 170 and the robots 161 and 162, the user can possibly determine that the collision has occurred due to inadequate control information for controlling the robots 161 and 162 described in the control programs in the robot control devices 151 and 152. In this case, the user needs to modify motion setting information of the robots 161 and 162. Specifically, the user issues an instruction to modify position data or angle data of each shaft described in the control program. The client 140 then receives the instruction to modify the control program by the user (Step S305 in FIG. 15). Specifically, it is allowable that the client 140 obtains the control programs in the robot control devices 151 and 152 in advance via the network 200 and the server 130, then the user modifies the control programs held in the storage device of the client 140, and then by receiving the modified control programs, the client 140 receives the instruction to modify the control programs. It is also allowable that the client 140 receives the instruction to modify the control programs by receiving details of modification of the control programs performed by the user.

The client 140 having received the instruction to modify the control program transmits this modification instruction to the server 130 (Step S306 in FIG. 15 and FIG. 17). Further, the server 130 having received the instruction to modify the control program transmits this modification instruction to the robot control device 151 (Step S307 in FIG. 15 and FIG. 18). The robot control device 151 receives the instruction to modify the control program, and then modifies this control program. It is sufficient that when the received instruction to modify the control program provides a modified control program, then the robot control device 151 overwrites the control program with the modified control program. It is sufficient that when the received instruction to modify the control program provides details of modification of the control program, then the robot control device 151 modifies the control program in accordance with the details of the modification.

As described above, in the monitoring system 100 according to the first embodiment, a user can issue an instruction to modify the control programs for controlling the robots 161 and 162, to the client 140 that can monitor a video replaying and displaying the actual motion of the workpiece 170 and the belt conveyor 190 in addition to the actual motion of the robots 161 and 162 at the production site. Due to this configuration, the user can modify the control programs for controlling the robots 161 and 162 remotely without visiting the production site. Accordingly, it is possible to immediately resolve the trouble or to realize an unmanned production site. The file format for the three-dimensional shape file 133 held by the server 130 may conform to the data format for the three-dimensional coordinate data of each shaft of the robots 161 and 162 included in the control programs described above. That is, the data format for the three-dimensional coordinate data of each shaft of the robots 161 and 162 in the control programs may be the same as the file data format for the three-dimensional shape file 133. Due to the same format, the monitoring system 100 can handle information of the three-dimensional coordinates in a file format that is the same as the data format used in the three-dimensional CAD (Computer Aided Design) in holding the information of the three-dimensional coordinates indicating the operational status of the factory facility 1, and in creating and modifying the three-dimensional coordinate data of the production device to be described in the control program. This can facilitate maintenance of the factory facility 1. When the data format for the three-dimensional coordinate data of each shaft of the robots 161 and 162 in the control programs, and the file data format for the three-dimensional shape file 133 are assumed to be the same general format, general three-dimensional CAD software can be used.

Figure 19:
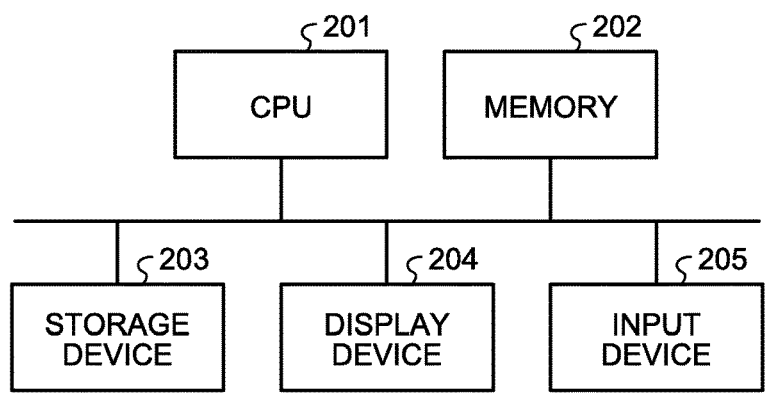
FIG. 19 is a diagram illustrating a hardware configuration when functions of the logging unit, the client, or the server according to the first embodiment are partially implemented by a computer.

FIG. 19 is a diagram illustrating a hardware configuration when the functions of the logging unit 110, the client 140, or the server 130 according to the first embodiment are partially implemented by a computer. When the functions of the logging unit 110, the client 140, or the server 130 are partially implemented by the computer, the functions of the logging unit 110, the client 140, or the server 130 are partially implemented by a CPU (Central Processing Unit) 201, a memory 202, a storage device 203, a display device 204, and an input device 205 as illustrated in FIG. 19. The functions of the logging unit 110, the client 140, or the server 130 are partially implemented by software, firmware, or a combination of the software and the firmware. The software or the firmware is described as a program and stored in the storage device 203. The CPU 201 reads the software or the firmware stored in the storage device 203 into the memory 202 and executes the read software or firmware to thereby implement a part of the functions of the logging unit 110, the client 140, or the server 130. That is, the logging unit 110, the client 140, or the server 130 includes the storage device 203 that stores therein programs for causing steps to be consequently performed, the steps implementing a part of the functions of the logging unit 110, the client 140, or the server 130 when the functions of the logging unit 110, the client 140, or the server 130 are partially implemented by the computer. These programs are also regarded as causing the computer to perform processes implemented by a part of the functions of the logging unit 110, the client 140, or the server 130. The memory 202 corresponds to a volatile storage area such as a RAM (Random Access Memory). The storage device 203 corresponds to a nonvolatile or volatile semiconductor memory such as a ROM (Read Only Memory) and a flash memory, and a magnetic disk. Specific examples of the display device 204 are a monitor and a display. The display unit 143 of the client 140 is implemented by the display device 204. Specific examples of the input device 205 are a keyboard, a mouse, and a touch panel.

The configurations described in the above embodiment are only an example of the content of the present invention. The configurations can be combined with other well-known techniques, and a part of the configuration can be omitted or modified without departing from the scope of the invention.

REFERENCE SIGNS LIST 1 factory facility, 100 monitoring system, 110 logging unit, 120 database, 130 server, 131 path-data creation unit, 132 alarm monitoring unit, 133 three-dimensional shape file, 134 bitmap file, 140 client, 141 path-data interpretation unit, 142 simulator unit, 143 display unit, 151, 152 robot control device, 161, 162 robot, 170 workpiece, 180, 181, 182 sensor, 190 belt conveyor, 201 CPU, 202 memory, 203 storage device, 204 display device, 205 input device, 300 bar, 301, 305, 310 thumbnail, 401 "real-time reproduction" button, 402 "normal reproduction" button, 403 "reverse reproduction" button, 1305 large screen.

The invention claimed is:

1. A monitoring system comprising:
a client device; and
a monitoring device to obtain information of three-dimensional coordinates at a plurality of time points, the information indicating an operational status of a factory facility including a production device, wherein the monitoring device includes:
a first processor; and
a first memory to store a first program which, when executed by the first processor, performs processes of:
creating path data on a basis of the three-dimensional coordinates at the plurality of time points in response to a reproduction instruction received by the client device, the path data describing a command for how to combine information of an image indicating the operational status of the factory facility with the three-dimensional coordinates and display the information, and creating a script or script file from the path data corresponding to the plurality of time points, and
a transmitter to transmit the created script or script file including temperature information of the factory facility and temperature information of the production site to the client device, and
the client device includes
a display device,
a second processor; and
a second memory to store a second program which, when executed by the second processor, performs processes of:
creating image data on a basis of the path data, the temperature information of the factory facility, the temperature information of the production site, information of the three-dimensional coordinates, and information of the image, and displaying a video using the created image data on the display device on a basis of the reproduction instruction.

2. The monitoring system according to claim 1, wherein the reproduction instruction is any of an instruction for real-time reproduction that is reproduction in a forward direction from a current time, an instruction for normal reproduction that is reproduction in a forward direction from a past time, and an instruction for reverse reproduction that is reproduction in a reverse direction from a reverse-reproduction time.

3. The monitoring system according to claim 2, wherein on a basis of the reproduction instruction, the second processor displays the video on the display device in any of the real-time reproduction, the normal reproduction, and the reverse reproduction.

4. The monitoring system according to claim 1, wherein the first processor creates the path data also on a basis of the three-dimensional coordinates of a workpiece to be handled by the factory facility.

5. The monitoring system according to claim 4, wherein the first processor further detects alarm information issued by a control device for a production device included in the factory facility, and to notify the client device of the alarm information.

6. The monitoring system according to claim 1, wherein information of the three-dimensional coordinates is stored in a Parasolid, IGES, STEP, STL, VPS, VRML, CATIA V5, Pro/E, NX, I-deas, or JT file format.

7. The monitoring system according to claim 1, wherein information of the image is stored in a DXF, DWG, ME-10, IGES, MicroCADAM drawing, DMNDOS, MCD, or BMI file format.

8. The monitoring system according to claim 1, further comprising:
a third processor; and
a third memory to store a third program which, when executed by the third processor, performs processes of:
obtaining information of the three-dimensional coordinates; and
the monitoring system further comprises:
a database to save therein information of the three-dimensional coordinates obtained by the third processor, wherein
the monitoring device obtains information of the three-dimensional coordinates from the database.

9. The monitoring system according to claim 1, wherein on a basis of a point-of-view position to a three-dimensional shape of the factory facility, the second processor displays the video simulating a motion of the three-dimensional shape viewed from the point-of-view position on the display device.

10. The monitoring system according to claim 1, wherein the client device receives an instruction to modify a control program for a control device to control a production device included in the factory facility.

11. The monitoring system according to claim 10, wherein a data format of a file format for a file holding information of the three-dimensional coordinates in the monitoring device is same as a data format for three-dimensional coordinate data included in the control program.

12. A monitoring method for a monitoring system including a client device and a monitoring device to obtain information of three-dimensional coordinates at time points, the information indicating an operational status of a factory facility including a production device, the monitoring method comprising:

creating path data on a basis of the three-dimensional coordinates at a plurality of time points in response to a reproduction instruction received by the client device, the path data describing a command for how to combine information of an image indicating the operational status of the factory facility with the three-dimensional coordinates and display the information, creating a script or script file from the path data corresponding to the plurality of time points, transmitting the script or script file including temperature information of the factory facility and temperature information of the production site from the monitoring device to the client device, creating image data on a basis of the path data, the temperature information of the factory facility, the temperature information of the production site, information of the three-dimensional coordinates, and information of the image; and displaying a video using the image data on a display device of the client device on a basis of the reproduction instruction.

\* \* \* \* \*